Oct. 13, 1964       H. W. GEHLEN ETAL       3,152,569
                      AMPHIBIOUS VEHICLE
Filed Aug. 23, 1962                     3 Sheets-Sheet 1
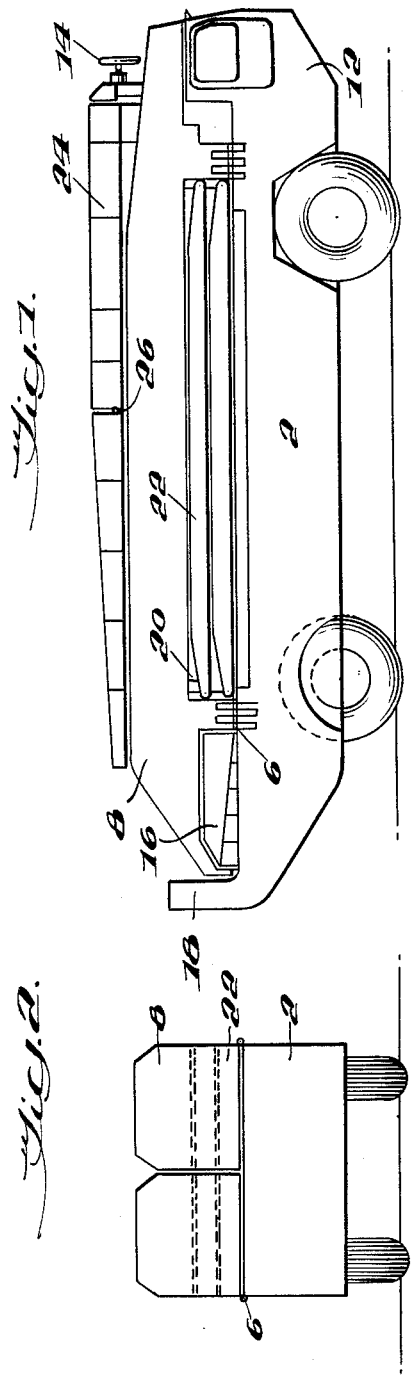
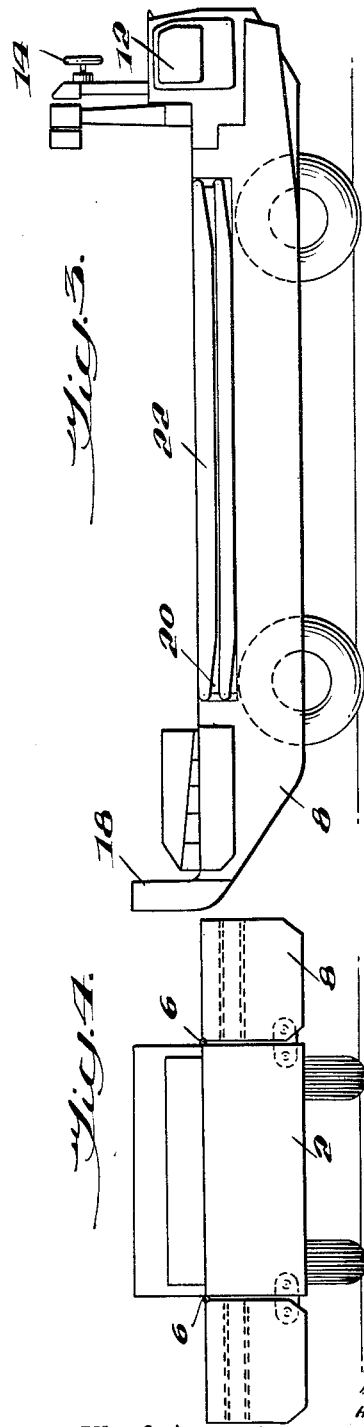
INVENTOR
HERMANN WALTER
        GEHLEN
HANS EBERHARD
RUDOLF PAWLUS
HEINZ BROCKMANN
BY Bailey, Stephens & Huettig
                        ATTORNEYS Oct. 13, 1964    H. W. GEHLEN ETAL    3,152,569
AMPHIBIOUS VEHICLE
Filed Aug. 23, 1962    3 Sheets-Sheet 2
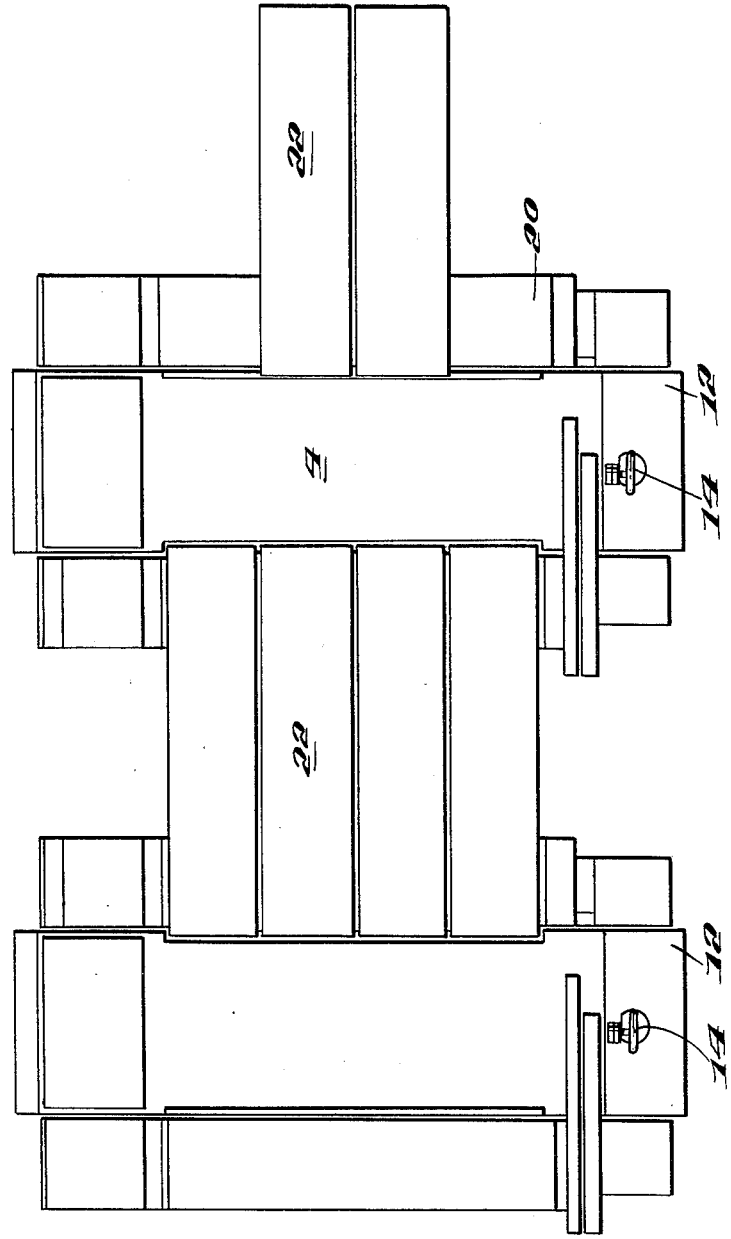
INVENTOR
HERMANN WALTER GEHLEN
HANS EBERHARD
RUDOLF PAWLUS
HEINZ BROCKMANN
BY Bailey, Stephens & Huettig
ATTORNEYS

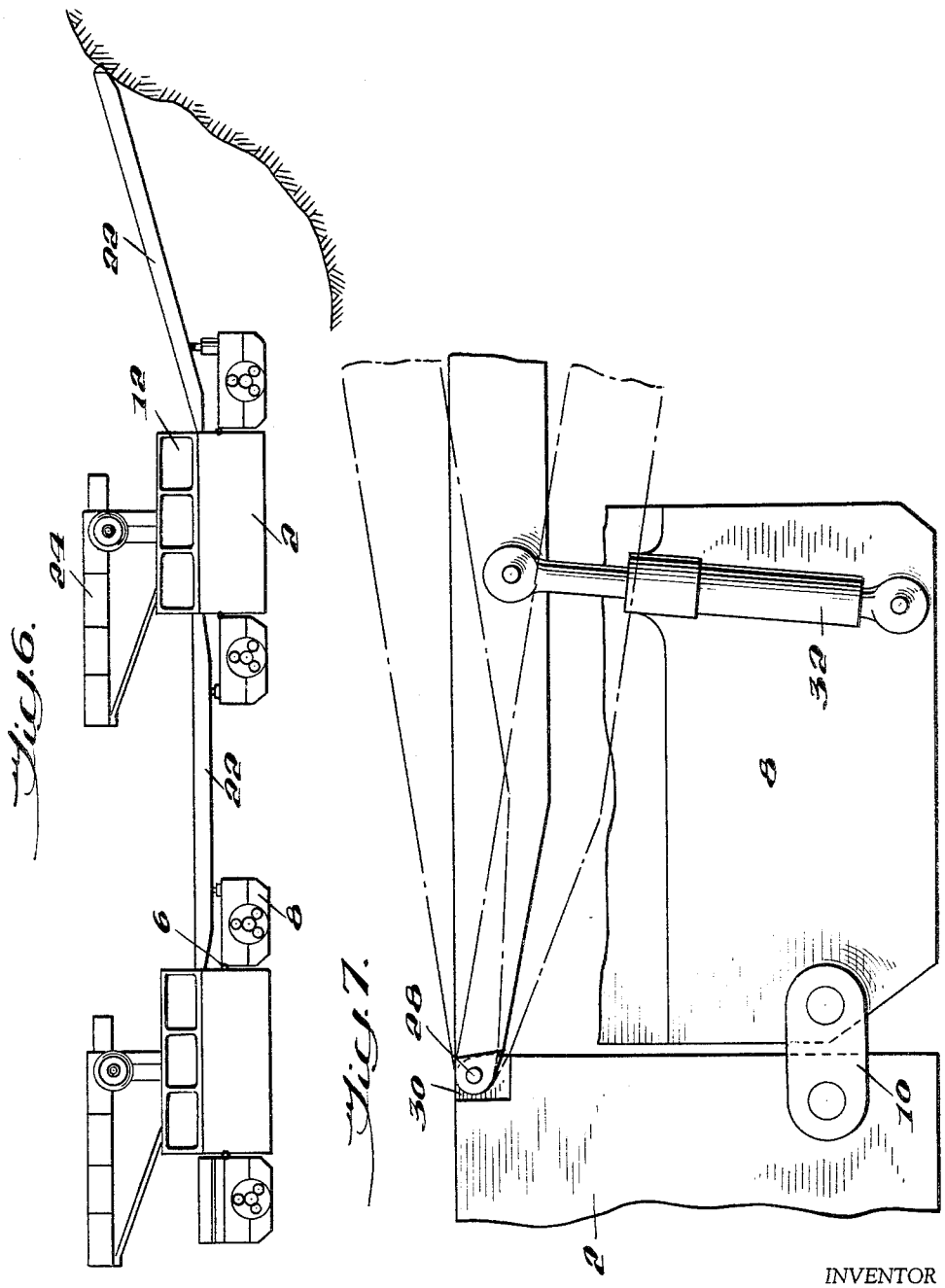

[No heading]

3,152,569
AMPHIBIOUS VEHICLE
Hermann Walter Gehlen, Kaiserslautern, Pfalz, Hans Eberhard, Duisdorf uber Bonn, Rudolf Pawlus, Mainz, and Heinz Brockmann, Kaiserslautern, Pfalz, Germany, assignors to Firma H. W. Gehlen K.G. Eisenwerke Kaiserslautern, Kaiserslautern, Pfalz, Germany
Filed Aug. 23, 1962, Ser. No. 219,073
Claims priority, application Germany, Aug. 23, 1961, G 32,984
5 Claims. (Cl. 114—43.5)

The invention relates to vehicles useful in constructing floating bridges and ferries, and especially to amphibious vehicles, especially for use in disaster areas or for military purposes.

Amphibious vehicles have been developed for travel on land or in the water, which were constructed in accordance with their primary use as a bridge part or as a ferry, or compromise solutions were adopted. A particular type of amphibious vehicle, which usually has its own means of guidance and locomotion, both on land and in the water, consists of a floating body which can be widened for water travel by outwardly pivotable auxiliary side floats.

For the desired uses, it is advantageous to provide such vehicles as, without additional mechanism, can be set up either as elements of a floating bridge or as individual ferries, or can be combined with similar vehicles to form larger ferries. A special problem in connection with such vehicles is the construction of the bridgehead, by which the vehicle is connected to the bank. There have been various attempts to provide such vehicles with ramps and to construct these ramps in such a way as to satisfy the various requirements. It has always been found, however, that the vehicles best suited to form parts of a floating bridge were of little use as ferries and vice versa.

The primary object of the present invention is to provide a construction which better satisfies the requirements of the various uses to which the vehicle may be put.

The invention contemplates a vehicle, preferably amphibious, for bridge forming and transport purposes, the deck of the floating body of which is directly accessible as a part of the load or carrying surface of a ferry or bridge, this body having auxiliary floats pivoted along each side, which for land transportation can be swung onto the deck of the floating body, but can be swung out beside the body for use in the water. There are separate ramp members which, during travel on land or use as a ferry, are carried in corresponding recesses in the auxiliary floats, but can be pivoted at their ends to the upper side edges of the main body for bridge purposes, and can be controlled in position by mechanism carried by the floats.

Preferably the ramp members have such dimensions that two of them fit in each recess and that four of them, arranged side by side, provide a track or path from one vehicle to another in forming a bridge.

To move the ramp members to their proper positions, the vehicle is provided with a crane.

Further objects and advantages of the invention will appear more fully from the following description, especially when taken in conjunction with the accompanying drawings which form a part thereof.

In the drawings:

FIG. 1 shows in side elevation a vehicle according to the invention in condition for land travel;

FIG. 2 is a cross-section substantially on the line II—II of FIG. 1;

FIG. 3 is a side elevation of the vehicle in condition for use as a ferry;

FIG. 4 is a cross-section on the line IV—IV of FIG. 3;

FIG. 5 shows in plan view and FIG. 6 in side elevation a vehicle in use in forming a bridge; and FIG. 7 shows the connection and control of the ramp members.

The vehicle has a floating main body 2. This body has a flat upper deck 4. Hinged to this body along an axis 6 substantially at the level of the deck, are auxiliary floats 8. These floats can swing between the position shown in FIGS. 1 and 2, in which they overlie the main body 2 and rest on the deck, and the position shown in FIGS. 3 and 4, in which they extend laterally from the main body. In the latter position, they can be held by releasable links 10.

The main body 2 has at one end a cab 12 with controls for land travel and a control position 14 for water travel, and at the other end a driving engine 16 with an upwardly extending outlet 18 for the exhaust gases.

In each float is a recess 20. This recess extends across the float, and is upwardly open when the float is in the position shown in FIGS. 3 and 4. In each recess is at least one ramp member, and preferably two such members. The ramp members have a length substantially equal to the length of the recess (that is, its dimension longitudinally of the vehicle). The total thickness of the ramp members in each recess is equal to its depth, so that, when the ramp members are in the recesses, as shown in FIGS. 3 and 4, their top surfaces are flush with, and form a continuation of, the deck. Likewise, the width of each ramp member equals the width of the float, so that, when a number of vehicles are positioned side by side, a continuous deck is formed. Also, the combined width of the four ramp members is substantially equal to the length of the recess.

The vehicle also carries a crane 24 for handling the ramp members. This crane is mounted to turn about a vertical axis. Its arm is provided with a hinge 26 near the mid-point, so that the arm can be folded when not in use, as seen in FIG. 5.

When used in making a bridge (see FIGS. 5 to 7), the ramp members 22 are removed from the recesses 20 and are positioned to extend across and through these recesses in side-by-side relation. One end of each ramp member is connected by a releasable pin 28 (FIG. 7) in a recess 30 in the upper side edge of body 2, so that its upper surface is flush with the deck 4. The other end may be similarly connected to a second vehicle, or, as shown at the left of FIG. 6, may form a bridgehead for connection to the bank. In the latter case, the angular position of the ramp member can be controlled by a hydraulic cylinder mechanism 32 carried by float 8.

The invention provides a simple construction capable of satisfying the various requirements of its different uses. It is formed of a small number of simple parts, so that substantially trouble-free operation is obtained. It thus does away with the need of having different vehicles for special purposes.

While we have described herein one embodiment of our invention, we wish it to be understood that we do not intend to limit ourselves thereby except within the scope of the claims hereto or hereinafter appended.

We claim:

1. A vehicle having a main floating body having a top deck, auxiliary floats each hinged to said body along one side thereof substantially at the level of said deck for movement between a first position extending laterally from the body and a second position overlying the body, each float having a recess extending transversely thereacross, said recess opening upwardly when the float is in the first position, ramp means removably carried in each recess, pivot means carried by the body to connect a first end of such ramp means to one side of the body with its upper surface level with the surface of said deck and in a position extending through said recess, said ramp connecting means being a pivot means, and means carried by each auxiliary float and connectible to said ramp means to swing the ramp means about said pivot means to a position in which the outer free end is higher than its first end.

2. In a vehicle as claimed in claim 1, said ramp means including two ramp members in each recess, the length of each ramp member and the total width of the ramp members carried by the vehicle being substantially equal to the length of the recess.

3. In a vehicle as claimed in claim 1, a crane mounted on said vehicle for handling the ramp means.

4. In a vehicle as claimed in claim 3, said crane having an arm mounted to turn about a vertical axis, said arm comprising two parts hinged together substantially centrally of its length about a vertical axis.

5. In a vehicle as claimed in claim 1, the total thickness of the ramp means in each recess equalizing the depth of the recess, whereby, when the floats are in the first position and the ramp means in the recesses, the upper surfaces of the ramp means are level with the deck of the body.

References Cited in the file of this patent

UNITED STATES PATENTS

| | | |
|---|---|---|
| 3,028,018 | Mott | Apr. 3, 1962 |
| 3,068,830 | Dickerson | Dec. 18, 1962 |

FOREIGN PATENTS

| | | |
|---|---|---|
| 1,098,389 | Germany | Jan. 24, 1961 |
| 1,105,301 | Germany | Apr. 20, 1961 |
| 864,857 | Great Britain | Apr. 12, 1961 |